Feb. 2, 1926.
R. L. DIAMOND
1,571,758
AGRICULTURAL IMPLEMENT
Filed Sept. 6, 1924   3 Sheets-Sheet 2
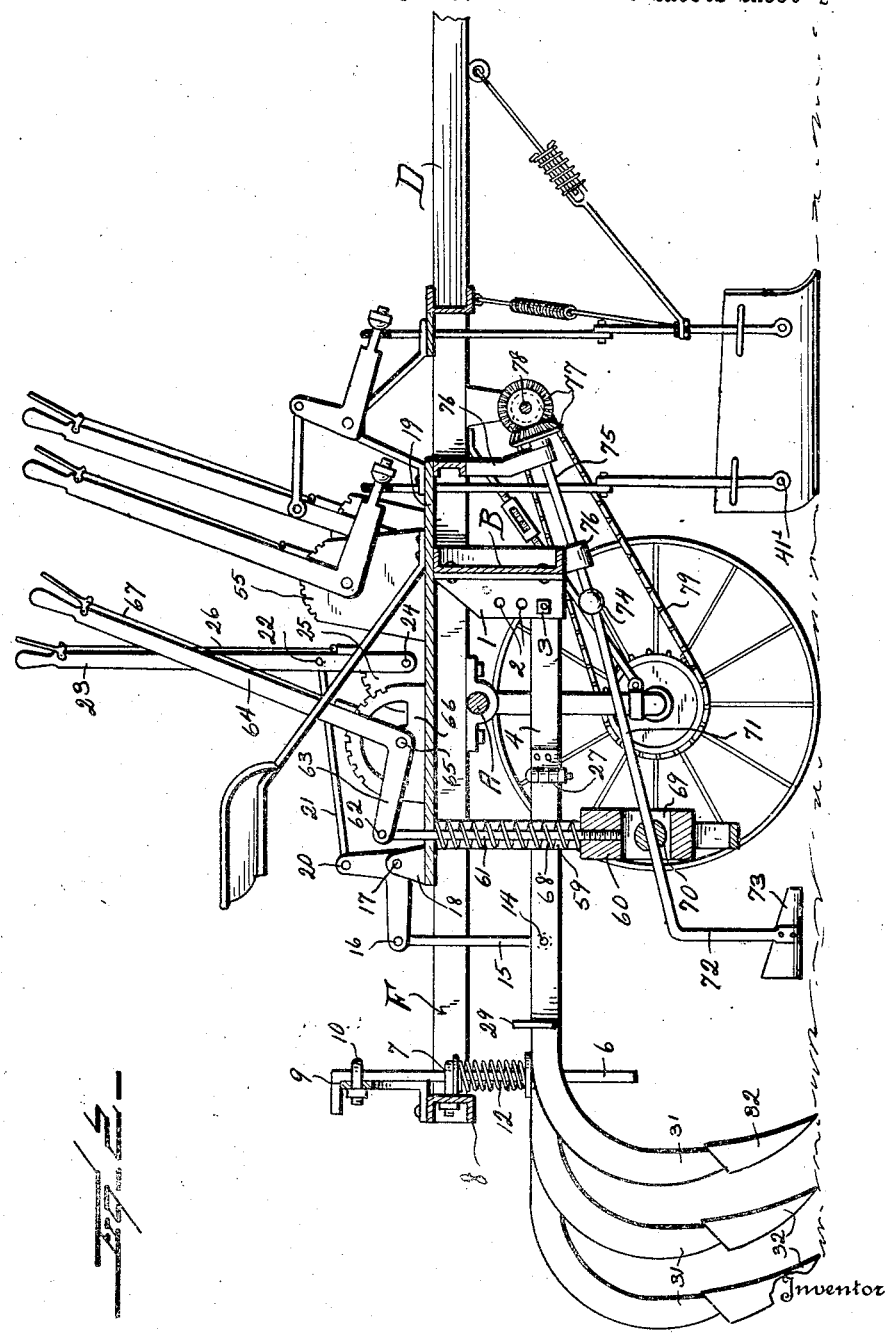

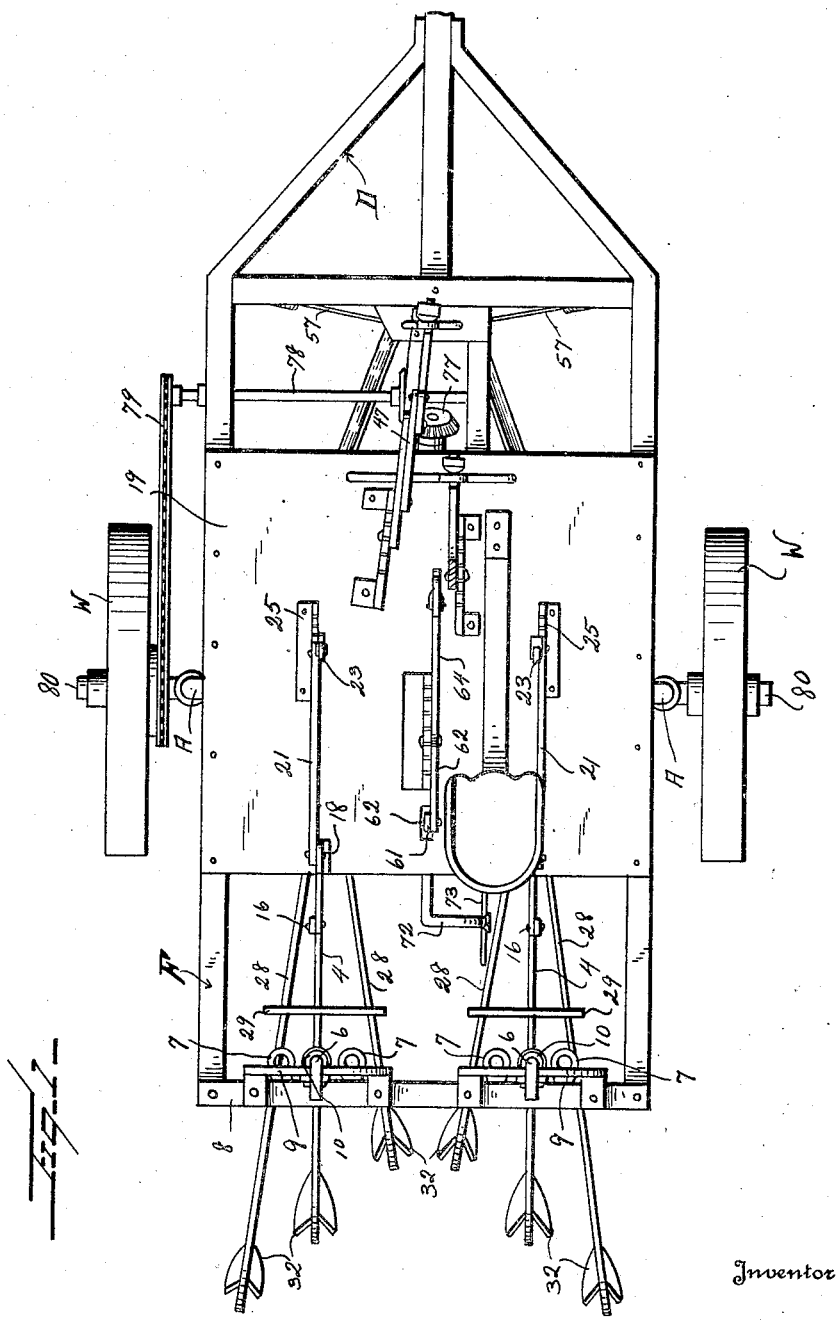

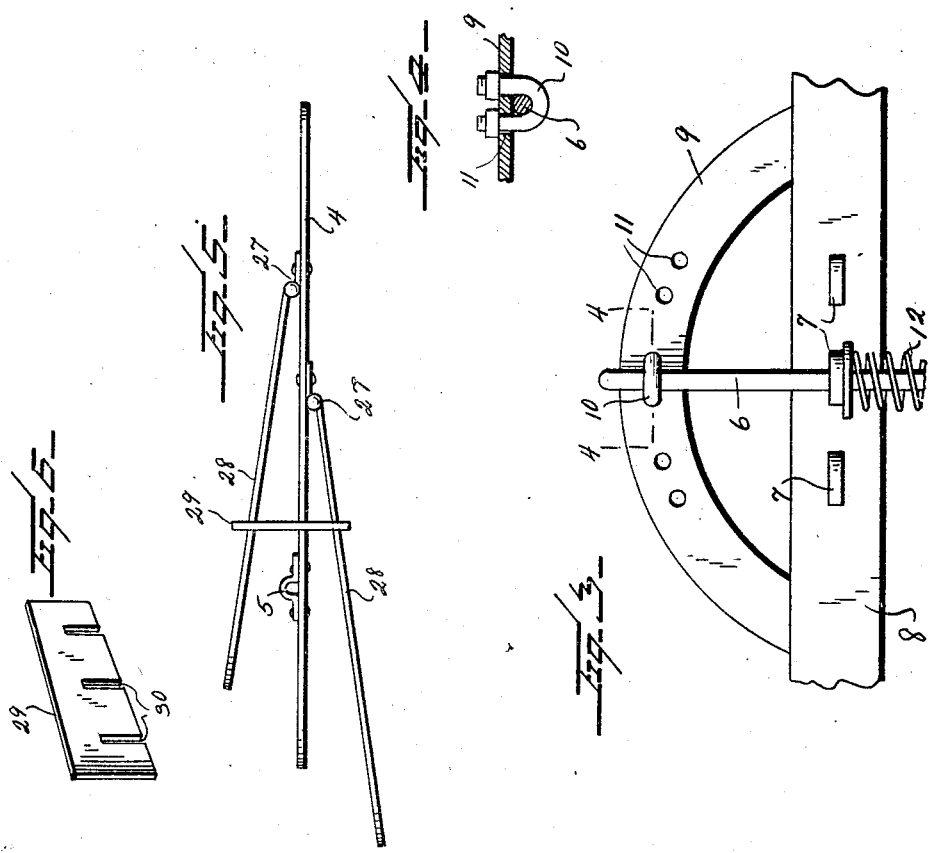

Patented Feb. 2, 1926.

1,571,758

UNITED STATES PATENT OFFICE.

RUBIN L. DIAMOND, OF McHENRY, MISSISSIPPI, ASSIGNOR OF ONE-HALF TO JOHN S. ADKISON, OF McHENRY, MISSISSIPPI.

AGRICULTURAL IMPLEMENT.

Application filed September 6, 1924. Serial No. 736,341.

*To all whom it may concern:*

Be it known that I, RUBIN L. DIAMOND, a citizen of the United States, residing at McHenry, in the county of Stone and State of Mississippi, have invented certain new and useful Improvements in Agricultural Implements, of which the following is a specification, reference being had to the accompanying drawings.

This invention relates to certain improvements in agricultural implements and it is an object of the invention to provide a novel and improved device of this general character provided with means whereby the ground working elements may be adjusted as the occasions of practice may prefer.

The invention consists in the details of construction and in the combination and arrangement of the several parts of my improved agricultural implement whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in top plan illustrating an agricultural implement constructed in accordance with an embodiment of my invention;

Figure 2 is a vertical sectional view taken longitudinally through the structure as illustrated in Figure 1;

Figure 3 is an enlarged fragmentary elevational view illustrating in detail the mounting for a set of cultivating elements;

Figure 4 is a detailed sectional view taken substantially on the line 4—4 of Figure 3;

Figure 5 is a view in top plan of a set of cultivating elements unapplied;

Figure 6 is a view in perspective of the spacing plate associated with the cultivating elements unapplied.

As disclosed in the accompanying drawings, F denotes a frame mounted upon the arched axle A which is provided at its forward end portion with a suitable draft rigging D. Depending from the frame F at a predetermined point in advance of the axle A and extending transversely thereof is a cross member or beam B. The beam B adjacent each end thereof is provided with a rearwardly directed plate 1 provided with a series of longitudinally disposed openings 2 through which is selectively engaged a bolt 3, said bolt 3 providing a pivotal connection for the intermediate or main plow beam 4. The rear end portion of the beam 4 has secured to a side thereof a rigid link 5 through which is freely disposed a vertically directed rod 6. This rod 6 is also selectively directed through an eye or guide member 7 extending inwardly from the rear cross member 8 of the frame F. The rod 6 overlies an arcuate member 9 carried by said rear member 8 and is held thereto by a U-bolt 10 selectively engaged through the opening 11 whereby the beam 4 may be maintained in its desired position with respect to the longitudinal center of the implement.

Interposed between the beam 4 and such eye or guide member 7 is an expansible member 12, herein disclosed as a coil spring, and which operates to constantly urge said beam 4 downwardly yet permits the same to have upward swinging movement as desired.

As herein disclosed, the beam 4 forwardly of the link 5 has pivotally engaged therewith, as at 14, an end portion of a rod 15 the upper or opposite end portion of which being pivotally connected, as at 16, with an arm of a bell crank lever 17. The heel portion of the bell crank lever 17 is pivotally supported, as at 18, by an upstanding bracket fixed to the rear portion of the flooring 19 overlying the central portion of the frame F.

The second arm of the bell crank lever 17 has pivotally engaged therewith, as at 20, a rod 21 which is also pivotally connected, as at 22, with an upstanding lever 23. This lever 23 is pivotally connected, as at 24, with the upstanding rack 25 carried by the floor 19 and carried by the lever 23 is a latch mechanism 26 of a conventional type for coaction with the rack 25.

Upon proper manipulation of the lever 23 the beam 4 may be readily raised when desired and maintained in required vertical adjustment. At opposite sides of the beam 4 and pivotally connected therewith, as at 27, at points spaced lengthwise of said beam 4 are the supplemental beams 28, one of said beams 28 terminating inwardly of the rear end of the beam 4 while the second beam 28 terminates beyond said rear end of the beam. The pivotal connection 27 of the beams 28 with the beam 4 permits said beams 28 to be laterally adjusted one with respect to the other and with respect to the beam 4 and the beams 28 are maintained in such desired adjusted positions by the plates 29 provided with suitably spaced open slots 30 which engage the beams 4 and 28 from above. It is to be noted that a number of these plates 29 are to be used with the slots 30 differently spaced.

The beams 4 and 28 have secured to the depending standards 31 thereof the plows 32 of a conventional type but preferably of a character employed for the purposes of cultivating.

As is illustrated in Figure 1 two sets or groups of beams 4 and 28 are employed, each group or set being capable of adjustment or regulation independently of the other.

Depending from the rear portion of the frame and at substantially its transverse center is a substantially U-shaped member 59 which forms a guideway for the sliding block or bearing 60. This bearing has extending upwardly therefrom a rod 61 which is directed through the flooring 19 and has its upper end portion operatively engaged, as at 62, with the rock arm 63 carried by the pivoted end portion of the hand lever 64. This lever 64 is pivotally connected, as at 65, with an upstanding rack 66 carried by the flooring 19 and the lever 64 is also provided with a latch mechanism 67 coacting in a well-known manner with said rack 66. Interposed between the flooring 19 and the block or bearing 60 is an expansible member 68, herein disclosed as a coil spring, surrounding the rod 61 and which serves to constantly urge the block or bearing 60 downwardly. By proper manipulation of the lever 64 said block may be raised as desired.

The block or bearing 60 is provided with a central opening 69 in which is arranged a rock bearing 70 through which is disposed the shaft 71. The rear end portion of the shaft 71 is provided with a depending arm 72 carrying the chopper blade 73. The forward end portion of the shaft 71 is connected by a universal joint 74 with the shaft 75 rotatably supported by the bearing 76 carried by the frame F. The forward end portion of the shaft 75 is in driven connection through the medium of the gears 77 with the transversely disposed shaft 78 rotatably supported by the frame F and extending to one side thereof. The extended portion of the shaft 78 is operatively connected by the chain 79 with one of the supporting wheels W mounted upon the spindles 80 of the axle A so that when the implement is in transit requisite rotation will be imparted to the shaft 71 to effect the desired chopping action. When desired the block or bearing 60 may be raised sufficiently to render the blade 73 inoperative or if preferred the gears 77 may be disconnected.

From the foregoing description it is thought to be obvious that an agricultural implement constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

An agricultural implement comprising, in combination, a portable body, a beam pivotally engaged therewith for movement in a vertical direction, a rigid link carried by the rear portion of the beam, a vertically disposed rod freely disposed through said link, an arcuate member carried by the body, the upper portion of the rod overlying said member, a member adapted to be selectively engaged at different points with the arcuate member and straddling the rod, a guide member carried by the body through which the rod is directed, an expansible member surrounding the rod between the beam and the guide member for constantly urging the beam downwardly, and ground engaging means carried by the beam.

In testimony whereof I hereunto affix my signature.

RUBIN L. DIAMOND.